United States Patent [19]

Schmitt

[11] Patent Number: 4,714,928
[45] Date of Patent: Dec. 22, 1987

[54] RADAR ALTIMETER STATIC ACCURACY CIRCUIT

[76] Inventor: Jerry C. Schmitt, 19930 Countryview Ter., Spring Hill, Kans. 66083

[21] Appl. No.: 835,634

[22] Filed: Mar. 3, 1986

[51] Int. Cl.$^4$ .............................................. G01S 7/40
[52] U.S. Cl. ..................................... 342/174; 342/122
[58] Field of Search ............... 342/120, 122, 165, 173, 342/174

[56] References Cited

U.S. PATENT DOCUMENTS 3,344,423  9/1967  Thue ............................... 342/122 X
4,176,353 11/1979  Pearson ........................... 342/120 X Primary Examiner—T. H. Tubbesing
Attorney, Agent, or Firm—Malcolm Reid

[57] ABSTRACT

A Radar Altimeter static accuracy circuit which provides improved system accuracy when the altimeter platform is stationary over the ground. Most often this stationary condition occurs in helicopters while hovering at low altitudes but also occurs, for example, in altimeters used to measure the level of grain in elevators. The altimeters output, a voltage proportional to altitude, is used to control a voltage controlled oscillator (VCO), the output of which is summed into the receiver intermediate frequency (IF) amplifier output to fill in the return signal fades. These fades otherwise cause altitude processor errors leading to erroneous altitude measurements. The VCO is adjusted to produce an output frequency equal to the IF amplifier output frequency.

5 Claims, 3 Drawing Figures

RADAR ALTIMETER STATIC ACCURACY CIRCUIT

BACKGROUND OF THE INVENTION

1. Field of the Invention

The present invention relates to a radar altimeter having a static accuracy circuit.

2. Prior Art

Radar altimeters, also often called radio altimeters, are used in aircraft to give the pilot an indication of his altitude above ground level (AGL) as opposed to the aircraft's barometric altimeter which is set to display the height above Mean Sea Level (MSL). Generally radar altimeters are used as a landing air or in ground proximity warning equipment. Therefore, the range of measurement is generally limited to 2500 feet; although many commercial air carriers only display radar altitude to the pilot when the aircraft is below 500 feet AGL.

Frequency modulated/continuous wave (FM/CW) radar altimeters are so named because they transmit a CW signal that is swept in frequency as opposed to a pulsed signal. The frequency sweep can have any number of shapes but a linear triangle or sawtooth is the most common.

The distance to the ground level, or the AGL altitude, is determined by measuring the frequency difference between the current transmitter frequency and a prior transmitter frequency delayed by the time required for the signal to propagate to the ground and back.

These prior art radar altimeters suffer from erratic performance when the altimeter's platform is nearly stationary over the ground. This is not a concern in fixed wing aircraft and has led to a problem largely being ignored. However, stationary operation is a condition common to helicopters prior to landing or in a sustained hover. In particular, the growing use of helicopters for medical evacuation where night operations at uncontrolled landing sites are a must has provided impetus for this invention.

The source of the erratic performance while the altimeter's platform is stationary can be traced to the nature of the ground return signal and is the same for both pulse and FM/CW radar altimeter implementations. The composite ground return signal is composed of a myriad of reflections of various amplitudes, phases, and distances which are dependent upon the radar altimeter antenna patterns, the frequency, the terrain, and the motion of the radar altimeter. The composite return signal is thus formed from the sum of these many components. Under certain circumstances the many components of the composite return signal cancel themselves out which leads to the erratic performance. This cancellation effect is frequency dependent and has a bandwidth that is generally less than the band swept by an FM/CW altimeter. By the utilization of this principal, the erratic performance can be overcome in FM/CW altimeter designs by the method of this invention.

Considerable insight into the return signal cancellation phenomenon is obtained by considering that a change in distance to the reflection has the same effect on the return signal as a change in transmitter frequency. Since the cancellation effect disrupts the altimeters performance over very narrow bands of altitude then a change in the transmitter frequency by an equal percentage will be sufficient to remove the cancellation.

In an FM/CW altimeter the transmitter frequency is constantly sweeping over a band of frequencies thus insuring that the return signal cancellation effects only a portion of the sweep.

The effect on measured altitude is multiplied by the aircraft installation delay used to allow altimeters to operate to zero altitude. For example, a prior art altimeter processor might measure an internal altitude, including the aircraft installation delay, 25% low when the signal cancellation extends over 25% of the transmitter sweep. However, the error in displayed altitude would rise to 50% if the actual altitude is equal to the aircraft installation delay. Since the aircraft installation delay is typically 20 feet to 40 feet, and this is the range of altitudes where the return signal cancellation phenomenon is most often encountered, the aircraft installation delay often acts to compound the erratic performance.

SUMMARY

DESCRIPTION OF THE PREFERRED EMBODIMENT

Figure 1:
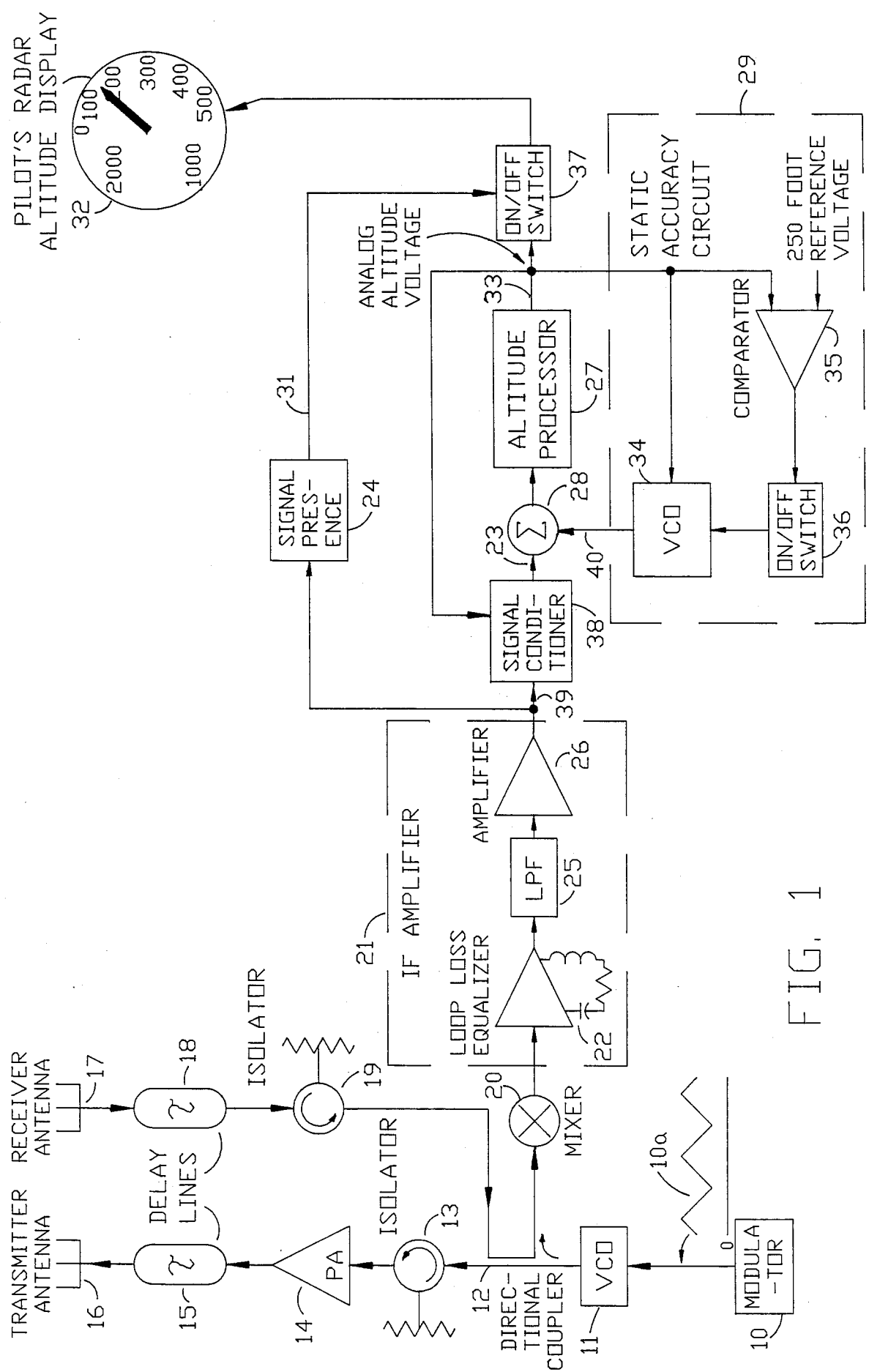
FIG. 1 is a block diagram illustrating a frequency modulated/continuous wave radar altimeter of the present invention having a static accuracy circuit.

The FM/CW radar altimeter block diagram of FIG. 1, shows the salient features of the present invention. Modulator 10 produces a triangular sweep voltage 10a, shown graphically in waveform (a) of FIG. 2, for application to transmitter voltage controlled oscillator (VCO) 11 of the transmitter. A small portion of the transmitter VCO 11 output is coupled into the receiver mixer 20 through directional coupler 12 while the majority of the power passes through transmitter isolator 13 to be amplified in power amplifier 14. The output of power amplifier 14 is then passed through transamitter delay line 15 to be radiated toward the ground by transmitter antenna 16. Ground return re-enters the sytem through receiver antenna 17 and passes through receiver delay line 18, receiver isolator 19, and directional coupler 12 to be mixed with the transmitter VCO 11 injection in mixer 20. The mixer 20 output to the intermediate frequency (IF) amplifier 21 is a signal, the frequency of which is equal to the altitude times an altitude scale factor.

Isolators 13 and 19 are in fact circulators with the third port terminated to form an isolator. They are used to block reflections from their respective antennas from re-entering the system, possibly resulting in the altimeter displaying the distance to a reflection from the antenna itself rather than the ground.

Delay lines 15 and 18 combine to form the aircraft installation delay. Aircraft installation delay is necessary to allow the altimeter to operate to zero external delay, that is, zero altitude, by providing some internal delay. Aircraft installation delay is generally expressed in feet of effective altitude. Therefore, it equals the combined time delay of both lines divided by 2 nanoseconds per foot.

The altitude scale factor is a measure of the frequency difference between the transmitter VCO 11 frequency at a given instant and a prior transmitter VCO 11 frequency delayed by the time required for the signal to propogate to the ground and back. This frequency difference is proportional to the distance above the ground level. The frequency difference is equal to the AGL altitude times two nanoseconds per foot for two way propagation delay multiplied by the FM sweep rate expressed in Hertz per nanosecond. Typically, an altimeter will sweep 100 MHZ in 50 milliseconds which produces an altitude scale factor of 40 HZ/foot.

IF amplifier 21 contains a loop loss equalizer 22 whose 6 db per octave slope cancels out the altitude dependency of the return signal amplitude. This altitude dependency is the effect of diffusion of the signal reflected from the ground on its return trip to the altimeter receiving antenna. The longer the path, the greater the diffusion and loss of return signal amplitude. The total signal loss in the trip to the ground and back is referred to as external loop loss and includes the effect of diffusion of the return signal, antenna gain, ground reflectivity, and operating frequency. Therefore the IF output signal 39 amplitude will vary with the ground reflectivity and other design factors but not the altitude.

In addition to the loop loss equalizer 22, IF amplifier 21 includes a low pass filter 25 to attenuate frequencies above the equivalent to 2500 feet and sufficient additional gain in amplifier 26 to produce the desired IF output voltage 39.

Figure 2:
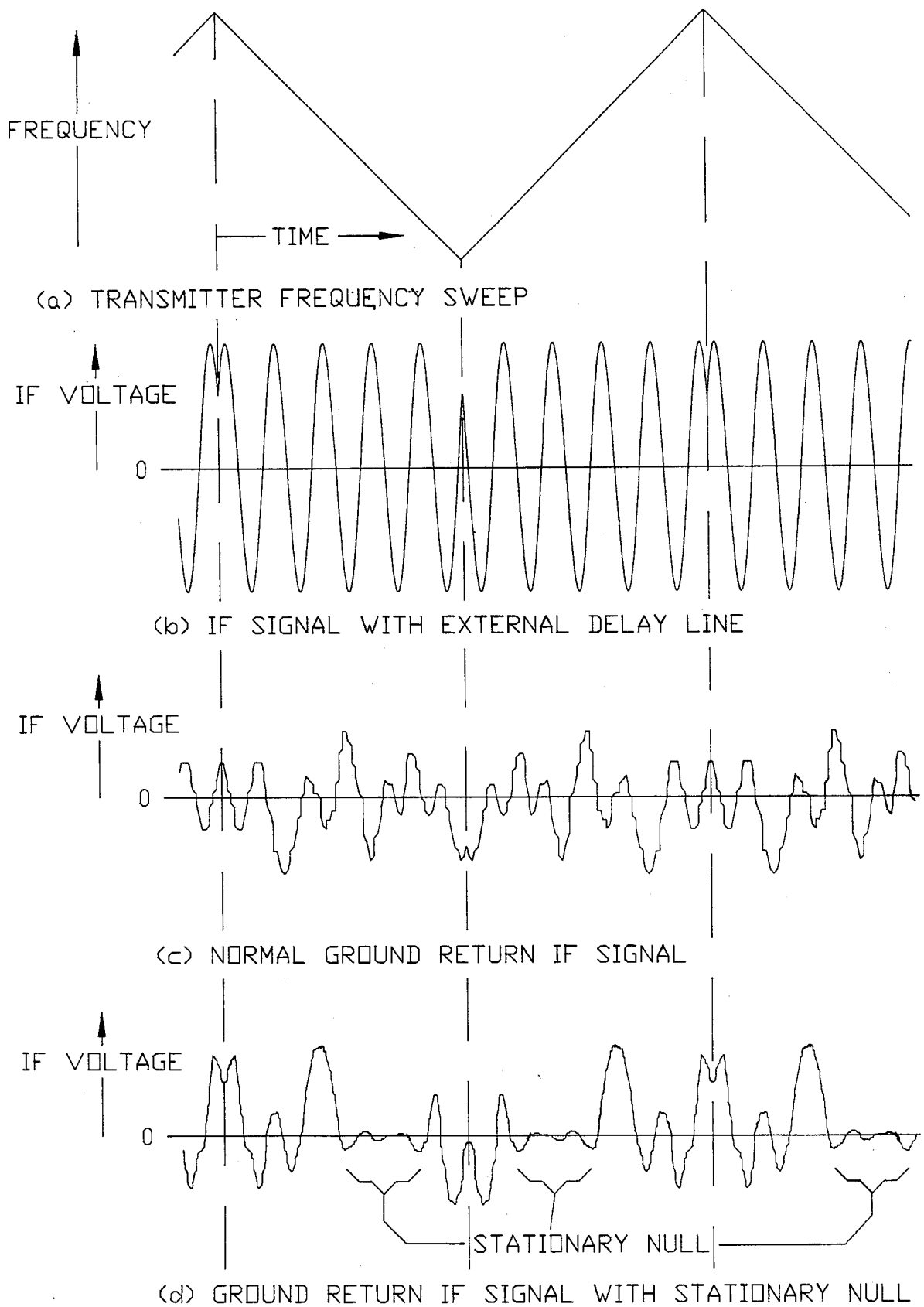
FIG. 2 is a graphical presentation of (a) the transmitter frequency sweep, (b) the return signal at IF for a fixed external delay line, (c) a normal ground return signal, and (d) a ground return signal with a stationary null.

Waveforms (b), (c), and (d), of FIG. 2 graphically show three representative IF output 39 waveforms. FIG. 2 shows the IF output when the path between delay lines 15 and 18 is completed with a delay line and attenuator rather than radiated from transmitter antenna 16, reflected from the ground, and received by receiver antenna 17. In this case the IF signal 39 is a steady tone and, as a result, is very simple to convert to an equivalent altitude.

The next IF output example, waveform (c) of FIG. 2, is representative of normal ground return. It appears to be much more difficult to determine the equivalent altitude and such is the case. However this is the problem that existing radar altimeters are designed to solve.

The third IF output example, waveform (d) of FIG. 2, is representative of ground return including a stationary null. In prior art altimeters this stationary null would result in significant altitude measurement errors because the altitude processor 27 has no signal to process during these times. The present invention overcomes this problem by supplying a static accuracy signal 40 that enables the altitude processor to continue functioning normally during the stationary null period.

The amplitude of the IF output signal 39 is then measured in signal presence circuit 24 to determine if sufficient ground return exists for altitude processor 27 to produce an accurate altitude measurement.

Signal conditioner 38 modifies the IF frequency response as a function of the analog altitude voltage 33. For indicated altitudes below 1250 feet the IF output signal 23 is attenuated at frequencies representative of altitudes above 1250 feet to provide the altitude processor 27 a lower noise input signal. For indicated altitudes above 1250 feet the IF output signal 23 is attenuated at frequencies representative of altitudes below 1250 feet to reduce the low frequency IF signal components resulting from the transmitter VCO 11 frequency sweep. Again this provides the altitude processor 27 with an improved input signal 23 thru summer 28.

With the addition of the static accuracy circuit 29, altitude processor 27 is less susceptible to nulls over a portion of the transmitter sweep. The static accuracy signal 40 is combined with the conditioned IF output signal 23 in summer 28 to produce a new input to the altitude processor 27.

If sufficient return exists the signal presence circuit output 31 enables switch 37 to pass the analog altitude voltage 33 to the pilot's display 32. Thence, the pilots display 32 uses the analog altitude voltage 33 to display the aircraft's altitude to the pilot.

Altitude processor 27 determines the altitude by measuring the IF output frequency, often by counting positive going zero crossings, although the actual technique is much more complicated than this simple statement would imply.

Static accuracy circuit 29 uses the analog altitude voltage 33 from altitude processor 27 to control the frequency of static accuracy VCO 34 when the measured altitude is below 250 feet as determined by static accuracy comparator 35.

Static accuracy VCO 34 is switched ON and OFF by static accuracy switch 36 which is in turn controlled by static accuracy comparator 35. When VCO 34 is ON, its output is combined with the conditioned IF output signal 23 in summer 28. Thus when the IF output signal 23 disappears due to cancellation, the static accuracy VCO 34 provides sufficient signal for altitude processor 27 to continue functioning. This injected static accuracy signal 40 is of an amplitude above the altitude processor's 27 minimum for operation but below the level of average return signal necessary for signal presence circuit 24 to close switch 37 passing the analog altitude voltage 33 on to the pilot's radar altitude display 32. Thus the level of the injected static accuracy signal 40 is on average always less than the minimum intermediate frequency amplifier output signal 39 necessary for signal presence circuit 24 to pass the analog altitude signal 33 on to pilot's radar altitude display 32. This insures that output 40 of the static accuracy circuit 29 can not take control of the altitude processor 27 except during the stationary null periods described earlier.

Static accuracy circuit 29 only functions below 250' because the return nulls are a low altitude phenonenon.

Earlier it was stated that the components of the composite altimeter return varied in amplitude and phase as a function of the altimeter's antenna illumination and the terrain. This also implies a variation in amplitude and phase as the frequency of the altimeter varies. As a result FM/CW altimeters should be less sensitive to stationary errors because of their much wider frequency spectrum.

Even though the FM/CW radar altimeter should be less susceptible to stationary errors than the pulse altimeter, it generally is not because most designs choose a simple processor design that is in itself particularly sensitive to the problem. As stated earlier, the nulls in the composite return are frequency dependent and, tests show, it does not persist over the entire sweep of the FM/CW radar altimeters frequency band. However, most altimeter's processing of the return measures the time between zero crossing of the IF signal and if the IF signal effectively disappears for, say, 25% of the altimeters sweep, then the measured altitude will be 25% low.

This invention comprises a radar altimeter with a static accuracy circuit 29 that removes the effects of return signal cancellation encountered during stationary altimeter operation.

The radar altimeter's ability to track the aircraft altitude above the ground is determined by the weakest return received over the sweep interval for this is the point at which tracking errors occur. As previously discussed, the return will typically vary in amplitude across the sweep interval because it is a composite of many amplitudes, frequencies, the phases which will periodically pass through additive and subtractive combinations.

During stationary operation the return can cancel for a significant portion of the transmitter sweep leading to large errors in the displayed altitude. A loss of track is also possible with many signal presence detectors. However the signal presence circuit of patent application Ser. No. 583,668 reduces this effect to its practical minimum.

Therefore, the design objective of the present invention is to include within a radar altimeter, a static accuracy VCO 34 controlled by the analog altitude voltage 33 to produce a static accuracy signal 40 for injection into the altitude processor 27 through summer 28. Static accuracy comparator 35 enables static accuracy VCO 34 via static accuracy switch 36 when it senses that the analog altitude voltage 33 is representative of an altitude below 250 feet.

Static accuracy signal 40 has the same average frequency as the conditioned IF output signal 23 produced by the ground return and acts to continue normal operation of altitude processor 27 during the periods of signal cancellation characteristic of stationary operation.

The output of static accuracy VCO 34 is a feedback signal that causes the altitude processor 27 to hold at its last output value for a period of time sufficiently long to span the periods of signal cancellation characteristic of stationary operation. The large errors in measured altitude that would otherwise result are thus avoided.

CIRCUIT DESCRIPTION OF THE PREFERRED EMBODIMENT

Figure 3:
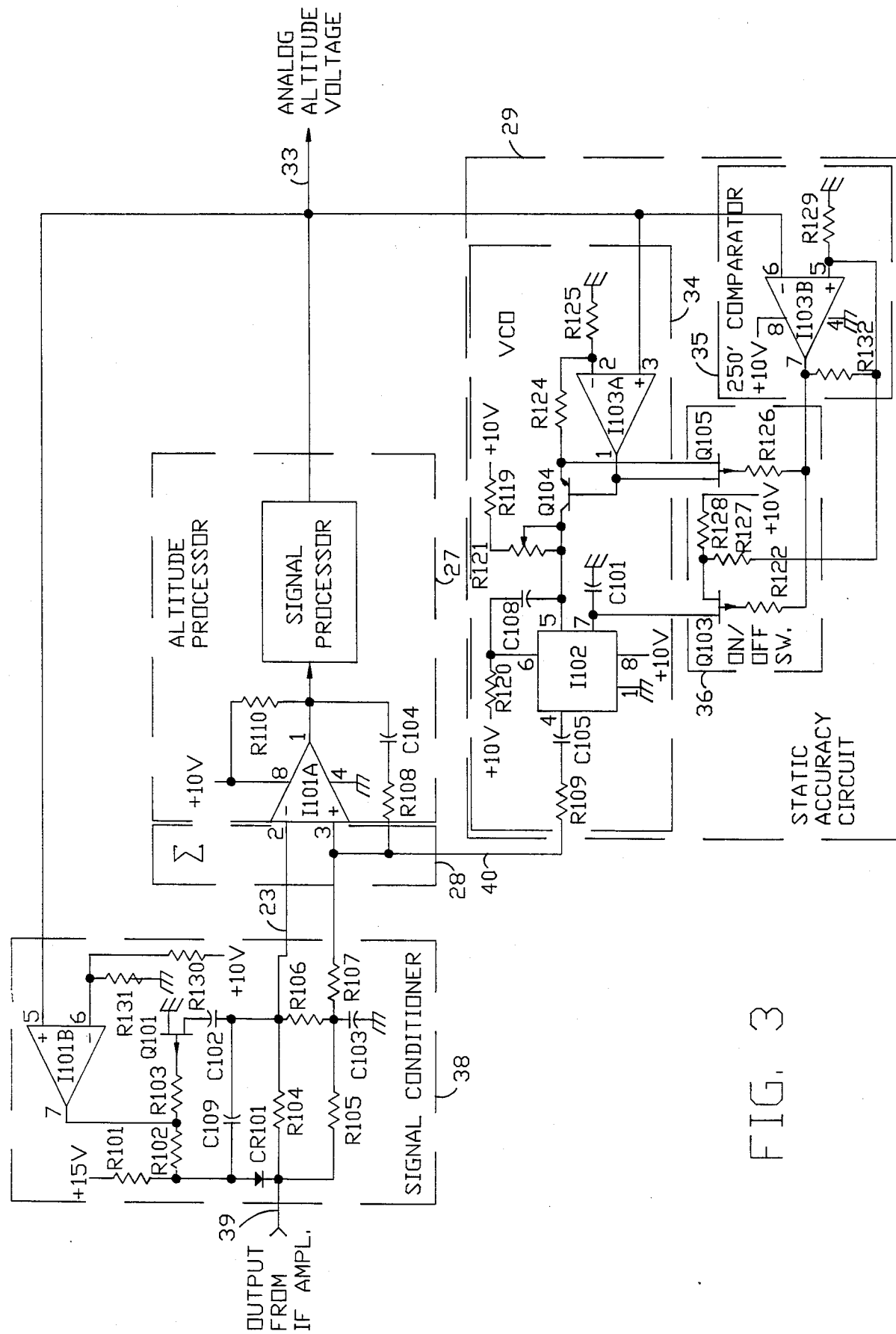
FIG. 3 is a schematic diagram of the static accuracy circuit.

FIG. 3 shows a schematic diagram of the static accuracy circuit 29, signal conditioner 38, altitude processor 27, and summer 28. The summer 28 and altitude processor 27 converge in the input portion of the altitude processor 27. Therefore, the functions described in the Circuit Description Of The Preferred Embodiment appear somewhat different than the functions described in the Preferred Embodiment.

Static accuracy switch 36 is implemented by disabling the static accuracy VCO 34 integrated circuit, I102, a Signetics NE566N function generator or voltage controlled oscillator. This is accomplished by applying a voltage to I102 pin 7 thru Q103 (2N5460) a first field effect transistor which is turned on by operational amplifier I103B (RCA CA 2904E) of static accuracy comparator 35 via R122 (1M Ohm). At the same time, a second field effect transistor Q105 (2N5461) via R126 (1M Ohm) turns off transistor Q104 (Motorola MPS 8097) which is a controlled current source used to vary the static accuracy VCO 34 frequency as a function of the analog altitide voltage 33.

Operational amplifier I103B (RCA CA2904E) compares the analog altitude voltage 33 with a voltage equivalent to 250 feet developed by R123 (6200 Ohm), R127 (3300 Ohm) and R129 (560 Ohm). R128 (36K Ohm) provides hysteresis to stabilize the operational amplifier when the altitude is near 250 feet.

Static accuracy VCO 34 is composed of function generator I102 (Signetics NE 566N), operational amplifier I103A (RCA CA 2904E) and transistor Q104 (Motorola 8097). I103A and Q104 are required to convert the analog altitide voltage 33 into a suitable proportional control current for the circuitry of function generator I102. The series combination of R119 (5100 Ohm) and potentiometer R121 (1000 Ohm) along with C101 (0.01 uF) and R120 (6040 Ohm) determine the ratio between the control current from the collector of Q104 and the oscillation frequency of function generator I102. This ratio is adjusted by R121 as a means of tracking the static accuracy VCO 34 frequency to the frequency of the conditioned IF signal 23.

C108 (1000 pF) is required to stabilize function generator I102.

The VCO 34 output at function generator I102 pin 4 is then coupled thru C105 (1000 pF) and divided down by R109 (330K Ohm) and R107 (33K Ohm) to produce one input to summer 28 at summer comparator 1101A pin 3 (National LM2903N).

The IF signal component to summer 28 appears on pin 2 of summer comparitor I101A (National LM2903N). The limited output at pin 1 of I101A is then dependent on the sum of the two inputs. Note that these two inputs are summed on the positive and negative inputs of I101A but, in this situation, it is no different than summing both on one input since the phase and amplitude relationship between the two inputs constantly changes, that is they are incoherent with respect to each other.

R105 (3300 Ohm) and C103 (1 uF) provide a DC reference for the summer comparator I101A thus eliminating errors due to shifts in the DC bias output from the IF amplifier 26.

R104 (8200 Ohm), R106 (8200 Ohm), C109 (1000 pF) and C102 (330 pF) are the frequency selective components in the two filters used in signal conditioner 38 to enhance the altitude processor's 27 performance. The signal conditioner 38 circuit compares the analog altitude voltage 33 to a 1250 foot reference voltage produced by R130 (84K Ohm) and R131 (40.2K Ohm). Signal conditioner comparator I101B (National LM2903N) then turns on signal conditioner switch CR101 (1N4148) when the altitude is above 1250 feet and turns on FET switch Q101 (2N5461) when below 1250 feet. Below 1250 feet C102, in conjunction with the equivalent source resistance of R104 and R106, reduces the high frequency noise above a 1250 foot equivalent. Above 1250 feet, C109, again in conjunction with R104 and R106, reduce the amplitude of noise below 1250 feet although in this case the gain reduction must be limited or the altimeter might fail to begin functioning when on the ground. This occurs because the analog altitude voltage 33 goes above 2500 feet when the altimeter is unlocked, a condition that could prevent its locking to a return below 1250 feet if this second filter attenuated the low altitude components too much.

R110 (10K Ohm) is a pull up resistor for summer comparator I101A. C104 (220 pF) and R108 (4.7M Ohm) add a controlled amount of hysteresis to the summer comparator. This improves the altimeter performance by limiting the number of transitions in the summer comparator output. Again this is a function of the altitude processor 27.

The output of summer comparator I101A then enters the signal processor 30 block that contains the remaining functions of the altitude processor 27.

While I have disclosed a preferred embodiment description and application of the invention, other modifications of the invention not specifically disclosed or referred to will be apparent to those skilled in the art in light of the foregoing description. This description is intended to provide a concrete example of a preferred embodiment structure and application clearly disclosing the present invention and its operative principles. Accordingly, the invention is not limited to any particular embodiment or configuration of component parts. All alternatives, modifications, and variations of the present invention which fall within the spirit and broad scope of the appended claims are covered.

What is claimed is:

1. In a radar altimeter having an intermediate frequency amplifier and an altitude processor, a static accuracy circuit for reducing erroneous altitude indications caused by stationary nulls comprising:
   (a) a voltage controlled osciallator means for producing a signal whose frequency varies so that it is equal to the frequency of the output signal of the intermediate frequency amplifier at any instant in time; and
   (b) a means for feeding the signal back to the output of the intermediate frequency amplifier so that the output of the intermediate frequency amplifier and the signal are combined.

2. The static accuracy circuit of claim 1, wherein the voltage control oscillator is comprised of:
   (a) a means for converting the analog altitude voltage from the output of the altitude processor to a proportional current; and
   (b) a function generator, the output of which is a signal whose frequency varies as a function of the proportional current which is its input.

3. The static accuracy circuit of claim 2, wherein the means for converting the analog altitude voltage to a proportional current is comprised of:
   (a) A operational amplifier having the analog altitude voltage as its first input; and
   (b) a transistor having as a base input the output of the operational amplifier, as a collector output a current which is proportional to the analog altitude voltage, and whose emitter output current is the second input to the operational amplifier.

4. The static accuracy circuit of claim 1, also comprising a switch and comparator for switching the static accuracy circuit off when the altitude is above a preset altitude level.

5. The static accuracy circuit of claim 4, wherein the switch is comprised of:
   (a) a first field effect transistor having its gate connected to the output of the static accuracy comparator and its drain to the input of the static accuracy function generator whereby the static accuracy function generator is disabled when the analog altitude voltage exceeds a preset level, and
   (b) a second field effect transistor having its gate connected to the output of the static accuracy comparator and its drain to the base of a controlled current source transistor of the VCO and its source to the emitter of the controlled current source transistor whereby the controlled current source transistor is turned off when the analog altitude voltage to the static accuracy comparator exceeds a preset level.

* * * * *